(12) United States Patent
Freitag et al.

(10) Patent No.: US 9,097,562 B2
(45) Date of Patent: Aug. 4, 2015

(54) FLEXIBLE STRIP COMPRISING AT LEAST ONE OPTICAL FIBRE FOR CARRYING OUT DEFORMATION AND/OR TEMPERATURE MEASUREMENTS

(75) Inventors: Nicolas Freitag, Orsay (FR); Marc Turpin, Bellerive sur Allier (FR); Philippe Charbonnier, Montbrison (FR)

(73) Assignee: TERRE ARMEE INTERNATIONALE, Velizy Villacoublay (FR)

( * ) Notice: Subject to any disclaimer, the term of this patent is extended or adjusted under 35 U.S.C. 154(b) by 475 days.

(21) Appl. No.: 13/521,417

(22) PCT Filed: Jan. 11, 2011

(86) PCT No.: PCT/FR2011/050047
§ 371 (c)(1),
(2), (4) Date: Jul. 10, 2012

(87) PCT Pub. No.: WO2011/083286
PCT Pub. Date: Jul. 14, 2011

(65) Prior Publication Data
US 2012/0300807 A1 Nov. 29, 2012

(30) Foreign Application Priority Data
Jan. 11, 2010 (FR) ..................................... 10 50136

(51) Int. Cl.
*G01K 11/32* (2006.01)
*G01D 5/353* (2006.01)
(Continued)

(52) U.S. Cl.
CPC .............. *G01D 5/353* (2013.01); *G01D 11/245* (2013.01); *G01M 11/083* (2013.01); *G01M 11/086* (2013.01)

(58) Field of Classification Search
CPC ..... G01J 5/0821; G01J 3/0218; G01J 1/0425; G01K 1/02
USPC ......... 374/120, 121, 130–132, 137, 139, 141, 374/208; 73/783, 800; 356/73.1, 911; 250/227.17, 227.16, 227.14; 385/12
See application file for complete search history.

(56) References Cited

U.S. PATENT DOCUMENTS 4,634,217 A 1/1987 Levacher et al.
5,399,854 A 3/1995 Dunphy et al.
(Continued)

FOREIGN PATENT DOCUMENTS

DE 33 05 234 A1 8/1984
EP 2 128 571 A1 12/2009

OTHER PUBLICATIONS

Glisic B et al: "Integration of long-gage fiber optics sensor into a fiber-reinforced composite sensing tape", Proceedings of the SPIE—the International Society for Optical Engineering, vol. 5050, 2003, pp. 179-186, XP002649870.

*Primary Examiner* — Gail Kaplan Verbitysky
(74) *Attorney, Agent, or Firm* — McKenna Long & Aldridge LLP

(57) ABSTRACT

The invention relates to a flexible strip (1) for a civil engineering structure, that can extend longitudinally along a longitudinal axis and comprises at least one optical fiber (20) enabling a structure to be localized and measured in terms of deformation and/or temperature, where said optical fiber (20) is essentially arranged along the longitudinal axis and is surrounded by an at least partially reinforced thermoplastic polymeric matrix of continuous reinforcement fibers (30), essentially along the longitudinal axis, and where the mass quantity of continuous reinforcement fibers extending essentially along the longitudinal axis, WCF, is higher than, or equal to, ten times the mass quantity of optical fiber(s), WOF. The invention also relates to metrology devices and associated methods.

10 Claims, 5 Drawing Sheets

(51) Int. Cl.
*G01D 11/24* (2006.01)
*G01M 11/08* (2006.01)

(56) References Cited

U.S. PATENT DOCUMENTS

| | | | | |
|---|---|---|---|---|
| 5,684,297 A | * | 11/1997 | Tardy | 250/227.14 |
| 7,237,950 B2 | * | 7/2007 | Shioji et al. | 374/161 |
| 7,315,666 B2 | * | 1/2008 | Van Der Spek | 385/12 |
| 2003/0066356 A1 | * | 4/2003 | Kanellopoulos et al. | 73/800 |
| 2008/0144698 A1 | * | 6/2008 | Cloutier et al. | 374/161 |
| 2008/0204706 A1 | * | 8/2008 | Magne et al. | 356/32 |
| 2011/0205526 A1 | * | 8/2011 | Brown et al. | 356/32 |
| 2012/0210793 A1 | * | 8/2012 | Daton-Lovett | 73/570 |
| 2013/0170519 A1 | * | 7/2013 | Alliot | 374/161 |
| 2014/0036957 A1 | * | 2/2014 | Farhadiroushan et al. | 374/161 |
| 2014/0218716 A1 | * | 8/2014 | Brown et al. | 356/32 |
| 2015/0021799 A1 | * | 1/2015 | Blazer et al. | 264/1.29 |

* cited by examiner

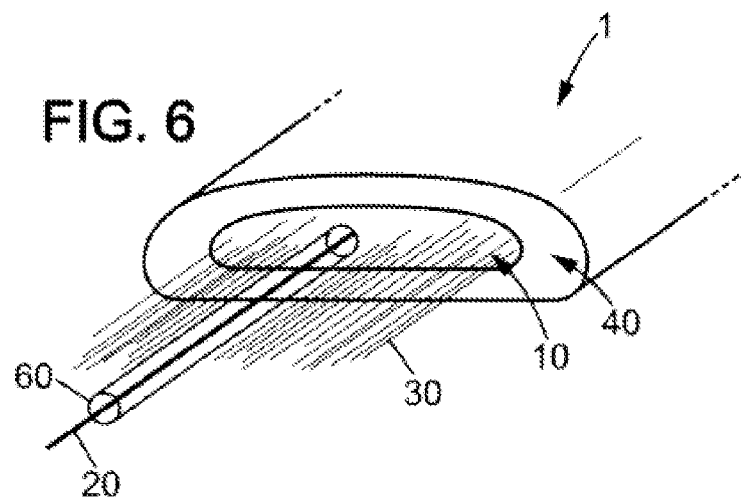
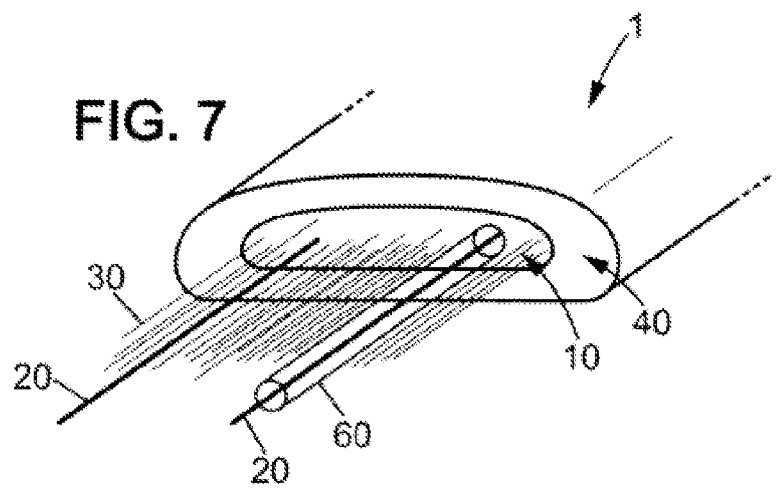

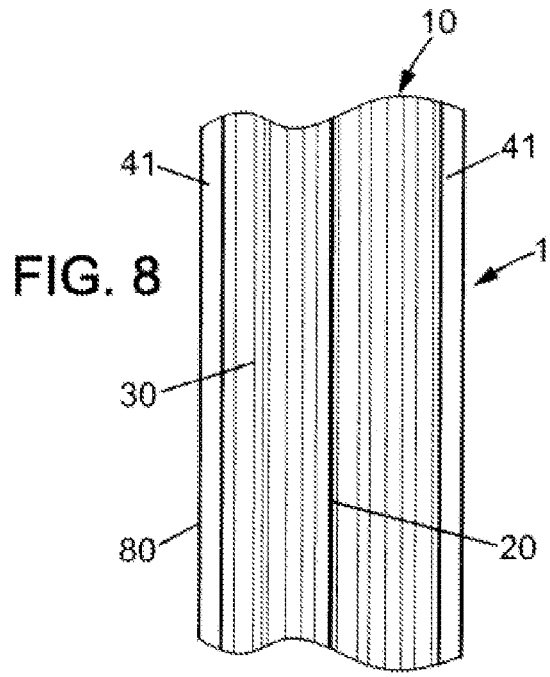
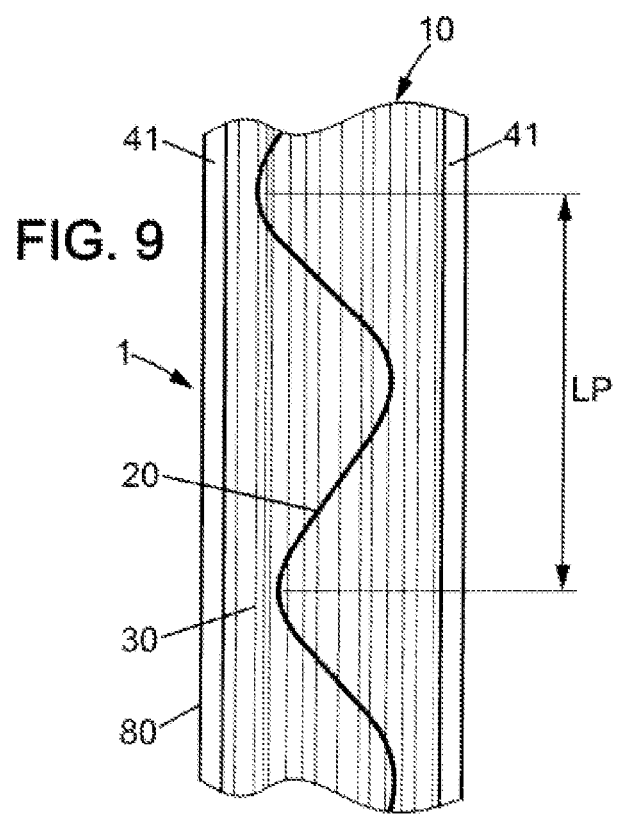

FLEXIBLE STRIP COMPRISING AT LEAST ONE OPTICAL FIBRE FOR CARRYING OUT DEFORMATION AND/OR TEMPERATURE MEASUREMENTS

This Application is a 35 U.S.C. §371 National Stage Entry of International Application No. PCT/FR2011/050047, filed Jan. 11, 2011 and claims the benefit of French Application No: 10 50136, filed Jan. 11, 2010, which is incorporated by reference in it's entirety herein.

BACKGROUND OF THE INVENTION

The invention relates to a flexible strip comprising at least one optical fibre for carrying out deformation and/or temperature measurements in or on a civil engineering structure.

It aims in particular to locate and measure disruptions such as deformations and/or temperature variations in or on civil engineering structures. Such measurements are generally conducted over long periods of time in order to determine, for example, whether the structure is suffering damage and is at risk of deterioration; these tests or measurements enable precautionary monitoring, particularly for predictive maintenance.

In known prior art devices, optical fibres are placed in or on a surface of a structure to be monitored, in order to obtain measurements in situ. These optical fibres generally have a diameter of between 80 and 500 µm, and in particular about 150 µm, comprising a central portion consisting of a core and cladding which are capable of allowing light to propagate and at least one protective sheath.

However, the integration of such optical fibres in or on a civil engineering structure does present disadvantages. These optical fibres are fragile and can be damaged during placement or later on by the stresses they are exposed to (shear stresses, undesired bending of the fibre). In certain cases they may deteriorate over time, particularly in "hostile" environments where there is a risk of penetration of water or alkaline ions, for example followed by prolonged contact with such a "hostile" environment.

An object of the invention is to propose a device which allows determining locations and measurements of deformation and/or measurements of temperature for a structure, i.e. a civil engineering structure or a portion of a civil engineering structure, which prevents the above disadvantages. Another object of the invention is to provide such a device for a reasonable cost and to allow easy installation in the structure.

SUMMARY OF THE INVENTION

The invention thus proposes a flexible strip that can extend longitudinally along a longitudinal axis and is intended for installation in or on a civil engineering structure, comprising at least one optical fibre to allow determining locations and measurements of deformation and/or measurements of temperature for the structure, said optical fibre being arranged substantially along the longitudinal axis and being surrounded by a thermoplastic polymer matrix that is at least partially reinforced, substantially along the longitudinal axis, with continuous reinforcing fibres, the amount by weight of continuous reinforcing fibres extending substantially along the longitudinal axis, WCF, being greater than or equal to ten times the amount by weight of optical fibre(s), WOF.

Note that said flexible strip may be substantially neutral concerning the mechanical resistance of the civil engineering structure or may contribute to a reinforcing role of this structure. However, the material of the flexible strip is different from that of the major part of the structure. The latter consists for example of earth, concrete, and sealing materials.

Due to the flexible strip of the invention, the optical fibre or fibres can be protected from the mechanical and physico-chemical damage cited above, and a suitable load transfer for measurements between the structure (host environment) and the optical fibre(s) to determine locations and measurements of deformation and/or measurements of temperature for a structure can be assured.

"Strip" is understood to mean a part capable of extending longitudinally, along a longitudinal axis, having a length that is very significantly greater than the width perpendicular to the longitudinal axis, and this width being very significantly greater than the thickness (or height). As examples, the length of such a strip is at least one meter, for example about 3 to 10 meters, or significantly greater than that (tens to hundreds of meters, or even several kilometers); the width is between 1 and 30 cm, for example between 5 and 10 cm; the thickness is between 1 millimeter and several centimeters, for example between 2 and 10 mm.

As an example, such flexible strips may equip embankments, dikes, or structures of mechanically stabilized or compacted earth. Such strips may also be introduced into natural earth (by simple or directional drill holes) and/or embedded in sealing materials (mortar, resin, or other sealing material). Such strips may also be positioned on the surface of metal or concrete structure elements, or even be directly integrated into the concrete (elements of bridges, dams, aprons, etc.). They may also be integrated into dams of roller-compacted concrete (RCC) during construction. They may be placed in shallow trenches in the surface of the natural earth, for example in a karst collapse hazard area or a major landslide area.

"Very significantly superior" is understood to mean an amount that is at least twice the amount to which it is being compared.

In one embodiment, the width of the strip is at least five times greater than its thickness.

"Flexible strip" is understood to mean a strip capable of easily deforming along its length. As an example, a strip is considered to be flexible when it can be bent to a radius of curvature of 200 mm.

In one embodiment, a flexible strip can be bent to a radius of curvature of 50 mm.

In one embodiment, the strip is produced as a very long length and can be cut to form strips of the length desired for installation on or in a structure. Because of its flexibility, a very long strip can be rolled onto a spindle to form a spool or reel usable on-site. It is thus very easy to displace the very long strip and unroll it, and possibly cut it to the desired length, at the construction site for example.

The flexibility of this strip allows adapting it to the irregularities which may be encountered on or in a structure, while preserving the optical fibre(s) provided for performing the desired measurements and comprised within said flexible strip. These irregularities may, for example, be related to the shape of the structure, the presence of structure components that could damage an optical fibre, such as aggregate, reinforcing steel, gravel/sand present in the compacted soil, component elements of sealing mortar, etc.

In addition, the inventors have observed that choosing a device in the form of a strip, comprising at least one optical fibre, is particularly advantageous for obtaining deformation measurements in a structure, for example in an embankment, dike, or structure of reinforced earth. In fact, the strip shape provides a good load transfer between the environment (measurand) and the sensor, and depending on the case can lead to an amplification of the measurand effects by increasing the effective detection area.

The inventors have observed that the service life and load transfer of a flexible strip, particularly when inserted into a structure, is very significantly improved when the optical fibre (or fibres) is (are) surrounded by a thermoplastic polymer matrix comprising continuous reinforcing fibres extending substantially along the longitudinal axis of the flexible strip. The inventors were able to determine that a significant improvement to the behavior of such a flexible strip occurs when the amount by weight of continuous reinforcing fibres extending substantially along the longitudinal axis is greater than or equal to ten times the amount by weight of optical fibre(s).

In the invention, an orientation "substantially along an axis" is understood to mean an orientation of between +10° and −10° relative to this axis, and in particular between +5° and −5°. In one embodiment, the continuous reinforcing fibres extend along the longitudinal axis of the flexible strip.

In one embodiment, the thermoplastic polymer matrix is chosen from among the following list of matrices: polyethylene, polypropylene, PVC, polyether.

The thermoplastic polymer matrix may also comprise elastomers.

In one embodiment, the continuous reinforcing fibres are polymer fibres for which the matrix is chosen from among the following list of matrices: polyester, polyamide, polyolefin.

In one embodiment, which may be combined with the above embodiment, the continuous reinforcing fibres are chosen from among glass fibres, aramid fibres, carbon fibres, fibres from fibre crops such as flax or hemp fibres, and metal fibres. The continuous reinforcing fibres are generally, but this is not limiting, assembled in the form of threads comprising a plurality of fibres.

The continuous reinforcing fibres may be essentially arranged, or exclusively arranged, to be parallel to each other and to follow the direction of the strip axis. They may also be assembled into cord(s), plait(s) or strand(s).

In one embodiment, the central portion of the optical fibre, which is capable of allowing light to propagate, is mineral and more particularly is based on silica.

In another embodiment, this central portion of the optical fibre is organic ("POF", Plastic Optical Fibre).

In order to calculate the amount by weight, WOF, of the optical fibre(s) in a flexible strip, the central portion (core and cladding) and the protective sheath bonded to this central portion are taken into consideration. The optical fibre may be covered by other protections, particularly to form a cable, but the other protections are not taken into account in calculating the WOF value. These other protections may consist of a metal sheathing, or of various coverings, for example consisting of cloth and/or organic layers. The entire assembly can be in cable form.

The optical fibre used may be single-mode or multi-mode.

In one embodiment, the optical fibre comprises Bragg grating. In another embodiment, the optical fibre is used directly without adding any transducing element.

The optical fibre(s) of a flexible strip is (are) intended to be connected to a measurement device able to emit light and measure characteristics of the light reflected, backscattered, or transmitted in the optical fibre.

Usable measurement devices include the following: OTDR (Optical-Time-Domain-Reflectometer), OTDR-R (OTDR-Raman), BOTDR (Brillouin OTDR), OBR (Optical-backscatter-reflectometer which uses Rayleigh-based reflectometry), reflectometry using Bragg gratings, interferometric metrology, and polarimetric metrology.

A flexible strip of the invention, comprising at least one optical fibre, may further have one or more of the following optional features, individually or in any possible combination:

the amount by weight of continuous reinforcing fibres, WCF, extending substantially along the longitudinal axis, is greater than or equal to fifty times the amount by weight of optical fibre(s), WOF;

the flexible strip comprises at least one region in which the polymer matrix comprises continuous reinforcing fibres, distributed in a substantially uniform manner, surrounded by a region of polymer matrix free of continuous reinforcing fibre;

a region of the polymer matrix comprises continuous reinforcing fibres, and is free of optical fibre, and this region at least partially surrounds an optical fibre;

at least one optical fibre is arranged within a region where the polymer matrix comprises continuous reinforcing fibres;

at least one optical fibre is placed in direct contact with the polymer matrix;

at least one optical fibre is arranged in a tube having its outer wall in direct contact with the polymer matrix; it is possible for the same optical fibre to have a portion of its length in direct contact with the matrix and another portion of its length in a tube, and in this case different portions of the same optical fibre may have different functions (for example these portions respectively measure the elongation and measure the temperature);

the flexible strip comprises a plurality of regions in which the polymer matrix comprises continuous reinforcing fibres and at least one optical fibre, and these regions are arranged parallel to each other in the direction of the strip length, side by side in the direction of the strip width, and are separated by regions of polymer matrix free of continuous reinforcing fibre;

at least one optical fibre is arranged substantially parallel to the longitudinal axis of the flexible strip;

at least one optical fibre is arranged about a direction substantially parallel to the longitudinal axis of the flexible strip, for example following a path in the form of a sine wave;

an optical fibre is covered by at least 0.1 mm of polymer matrix, or even at least 0.5 mm of polymer matrix;

at least one external surface of the flexible strip has a degree of roughness or asperities that are more or less pronounced, which allow optimizing the load transfer between the host medium and said strip;

at least one outer edge of the flexible strip has a notched portion to optimize the load transfer between the host medium and said strip.

The invention also relates to an array of flexible strips bonded together, in particular by thermal welding, wherein the flexible strips include the features of any one of the above embodiments. It is thus possible to perform measurements in a two-dimensional space.

The invention also concerns a device for determining locations and measurements of deformation and/or measurements of temperature, comprising at least one flexible strip having the features of any one of the above embodiments or an array of the above flexible strips and a measurement device connected to at least one optical fibre of a flexible strip and capable of emitting light and measuring characteristics of the light reflected, backscattered, or transmitted in said optical fibre.

In one embodiment of said device, at least one flexible strip comprises at least one optical fibre arranged in direct contact with the polymer matrix, and this optical fibre is used to perform deformation measurements.

In one embodiment of said device, at least one flexible strip comprises at least one optical fibre arranged in a tube having its outer wall in direct contact with the polymer matrix and this optical fibre is used to perform temperature measurements.

The invention also relates to a method for determining locations and measurements of deformation and/or measurements of temperature in or on a civil engineering structure, which makes use of a device according to any one of the above features, comprising a step of emitting light and a step of measuring characteristics of the light reflected, backscattered, or transmitted in at least one optical fibre.

In one embodiment of this method, at least one flexible strip comprises at least one optical fibre arranged in direct contact with the polymer matrix, said fiber being used to perform deformation measurements, and at least one optical fibre arranged in a tube having its outer wall in direct contact with the polymer matrix, said fibre being used to perform temperature measurements, and the deformation measurement and temperature measurement are performed at the same time.

In another embodiment of this method, at least one flexible strip comprises at least one optical fibre arranged in direct contact with the polymer matrix and at least one optical fibre arranged in a tube having its outer wall in direct contact with the polymer matrix, and these two optical fibres are used simultaneously to obtain interferometric measurements.

BRIEF DESCRIPTION OF THE DRAWINGS

The invention will be better understood by reading the following description, provided solely as an example, and by referring to the attached drawings in which:

FIGS. 6 and 7 are schematic perspective views of an embodiment of a flexible strip of the invention;

FIGS. 8 and 9 are schematic views of a cross-section along the width and longitudinal axis of an embodiment of a flexible strip of the invention;

DESCRIPTION OF EMBODIMENTS

For clarity, the various elements represented in the figures are not necessarily to scale. Identical references correspond to identical elements in these figures.

Figure 1:
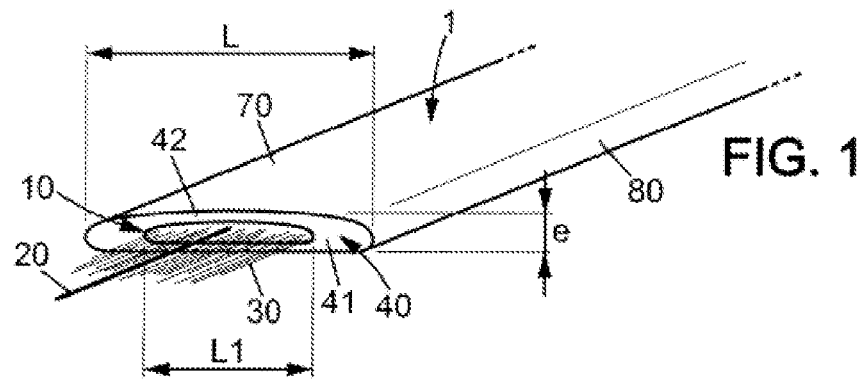
FIGS. 1 and 2 are schematic perspective views of an embodiment of a flexible strip of the invention.

FIG. 1 shows a schematic perspective view of an embodiment of a flexible strip 1 of the invention.

This flexible strip 1 comprises an optical fibre 20 arranged along the longitudinal axis, perpendicular to the width L and to the thickness (height) e of said flexible strip and surrounded by a thermoplastic polymer matrix comprising continuous reinforcing fibres 30. These continuous reinforcing fibres 30 are arranged in a region 10 forming a channel in which the optical fibre 20 is placed. The region 10, of width L1, is substantially arranged at the core of the strip 1 and is surrounded by a region 40 of polymer matrix free of continuous reinforcing fibre. In the case represented, the region 40 comprises two lateral regions 41 situated on each side when considering the width of the region 10 comprising the continuous reinforcing fibres and two regions 42 situated on each side when considering the height of said region 10. The flexible strip 1 represented comprises a main surface 70 extending width-wise and length-wise along the strip and an edge 80 extending height-wise and length-wise along said strip. In this example, the surface 70 is substantially flat and uniform and the edge 80 is rounded.

As an example:
L=20 mm
e=3 mm
L1=15 mm
WOF=330 dtex
(the unit "dtex" corresponds to g per 10,000 m)
WCF=150 000 dtex

WCF/WOF=450

Figure 2:
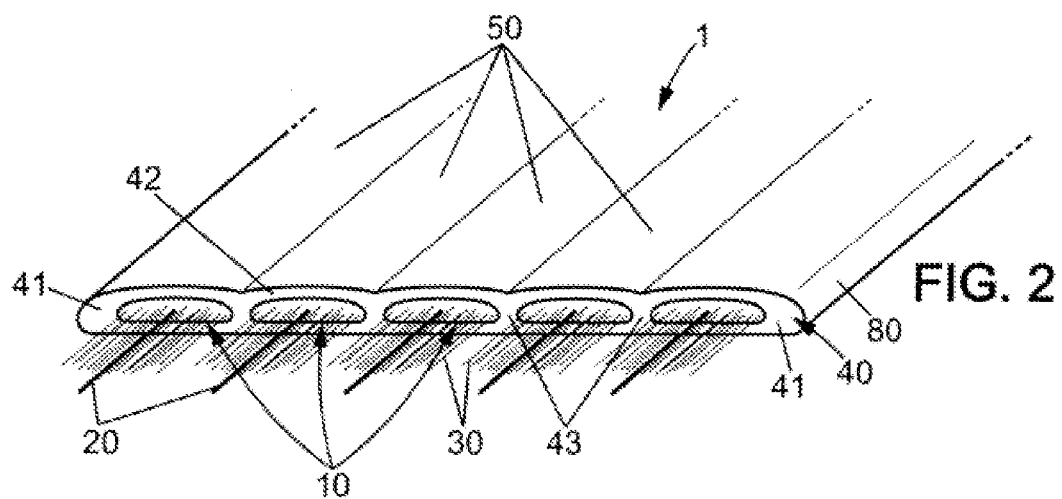

FIG. 2 shows a schematic perspective view of a second embodiment of a flexible strip 1 of the invention. This flexible strip comprises a plurality of regions 10 forming channels in each of which is placed an optical fibre 20. Two contiguous channels are separated by a wall 43 of polymer matrix free of reinforcing fibres. The strip illustrated in FIG. 2 may be considered as corresponding to placing side by side a plurality of "pseudo-strips" 50 of the type illustrated in FIG. 1.

As an example:
L (total width of the strip 1)=50 mm
e=4 mm
WOF=1 320 dtex
WCF=350 000 dtex

WCF/WOF=265

Figure 3:
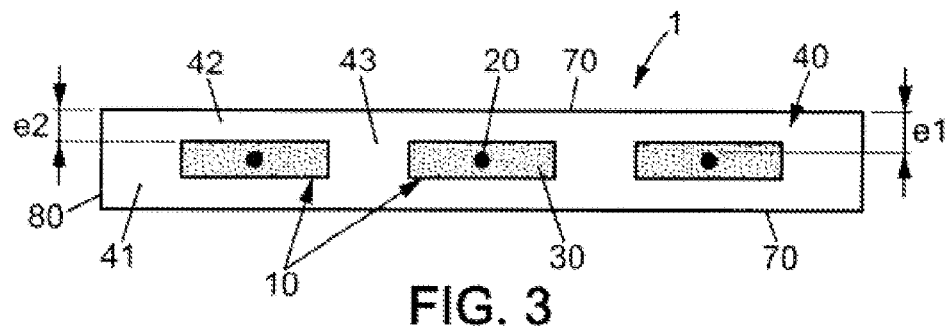
FIGS. 3 to 5 are schematic views of a cross-section perpendicular to the longitudinal axis of an embodiment of a flexible strip of the invention.

In another embodiment represented in a cross-section in FIG. 3, the flexible strip 1 has a substantially rectangular cross-section, as do the regions 10 forming the channels in each of which an optical fibre 20 is placed. As an example, the thickness or height e2 of the region 42 between the region 10 forming the channel and the main surface 70 of the strip is between 10 and 30% of the total thickness or height e of said strip. An optical fibre 20 is situated at a distance e1 from the main surface 70 of the strip. In the example represented, the optical fibre is situated at the center of the strip.

In one embodiment, the thickness between the exterior of the optical fibre and an external wall of the flexible strip of the invention, for example the thickness e1, is at least 0.1 mm of polymer matrix (with or without continuous reinforcing fibre), or even at least 0.5 mm of said polymer matrix.

Advantageously, the flexible strips corresponding to FIGS. 1 to 3 may be rolled onto a spindle to form a construction spool or reel. In these embodiments, it can be compactly wound with an upper main surface 70 in contact with a lower main surface 70.

Figure 4:
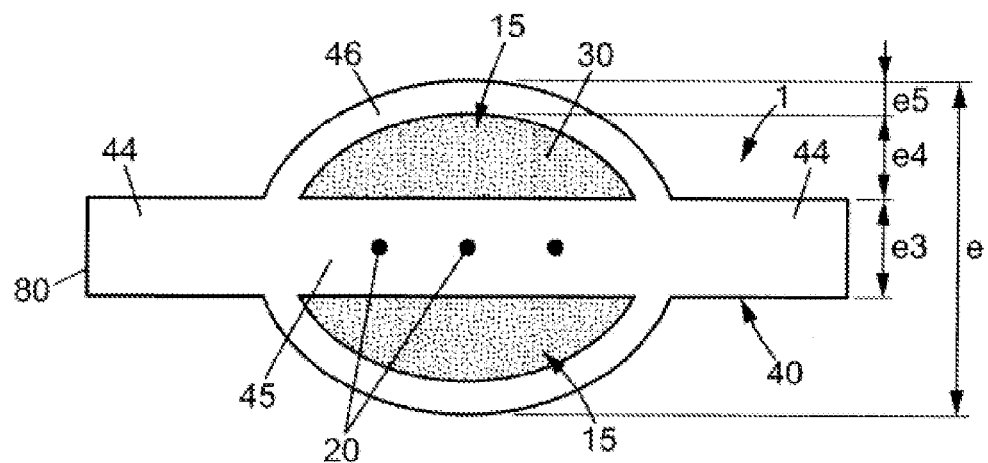
Figure 5:
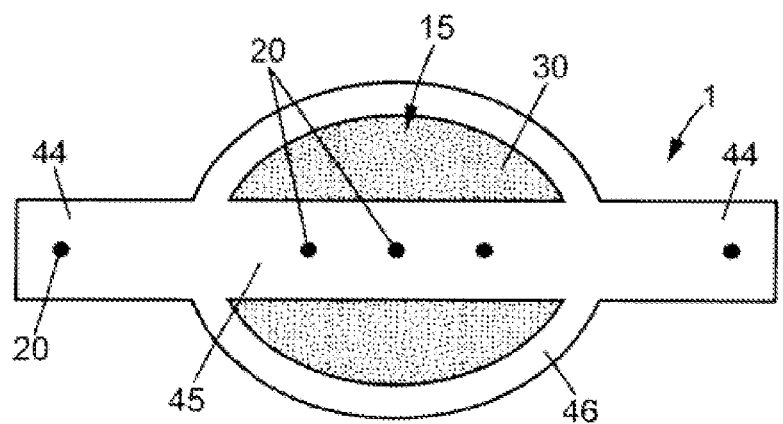

FIGS. 4 and 5 represent cross-sectional views of other embodiments of a flexible strip according to the invention, where the main surface is not flat. These strips can, however, be rolled onto a spindle to form a construction spool or reel, but in a less compact manner than with the above embodiments.

In the embodiment represented in FIG. 4, optical fibres 20 are arranged in a central portion 45 of the strip, in a polymer matrix free of continuous reinforcing fibres, and there is a region 15 of polymer matrix comprising continuous reinforcing fibres 30 on each side of the central portion 45 comprising optical fibres 20. On each side of this central portion 45, extending out in the direction of the width, are wings 44 free of continuous reinforcing fibres and optical fibre. The region 15 of polymer matrix comprising continuous reinforcing fibres is covered by a layer 46 of polymer matrix free of continuous reinforcing fibres. This region 15 ensures the mechanical resistance of the strip and the dimensions of the wings 44 can be chosen to optimize the load transfer between the flexible strip and the medium that surrounds it.

In one variant of the embodiment of FIG. 4, represented in FIG. 5, optical fibres 20 are also arranged in the wings 44.

As an example for the embodiments according to FIGS. 4 and 5:

e (total thickness of the flexible strip)=20 mm
e3 (thickness of the central portion)=5 mm
e4 (maximum thickness of the region 15)=5 mm
e5 (thickness of the layer 46)=2.5 mm
WCF=150 000 dtex
For the embodiment in FIG. 4:
WOF=990 dtex

WCF/WOF=150

For the embodiment in FIG. 5:
WOF=1650 dtex

WCF/WOF=90

FIGS. 6 and 7 show schematic perspective views of embodiments of the invention in which at least one optical fibre 20 is placed in a tube 60 where it is free of constraints. These embodiments are presented for the case of a flexible strip configuration similar to the one in FIG. 1. It goes without saying that these embodiments can have applications in the other flexible strips described above, or in any other flexible strip according to the invention. One will note that the fibre 20 arranged in a tube 60 may be arranged in this tube for its entire length or for only a portion of its length, the other portion possibly being integrally connected to the polymer matrix. The "tubed" optical fibre, free of constraints, may be integrated into a channel 10 (represented) or into a region 41 of polymer matrix free of continuous reinforcing fibre (not represented).

It should be noted that an optical fibre arranged in a tube is essentially independent of the stresses applied to the flexible strip in which it is located. Such an arrangement is particularly suitable for conducting temperature measurements.

In the embodiment in FIG. 7, an optical fibre arranged in a tube 60 is associated with an optical fibre integrally connected to the polymer matrix. Such a strip is particularly suitable for obtaining temperature measurements, using the fibre free of constraints in the tube, and deformation measurements simultaneously. Using the temperature measurement, it is possible to correct the measurements for any thermomechanical and thermo-optical deformations and thus to obtain precise measurements of local deformations of essentially mechanical origin.

It is also possible to obtain interferometric measurements with these two optical fibres.

FIGS. 8 and 9 show schematic cross-sectional views along the width and length of embodiments of flexible strips of the types illustrated in FIG. 1, to show the paths of the fibre in the flexible strip. The region 10 is represented, in which an optical fibre 20 has been placed and in which the polymer matrix comprises continuous reinforcing fibres, bordered by the region 41 of polymer matrix free of continuous reinforcing fibre.

In the example in FIG. 8, the optical fibre is arranged in a direction parallel to the longitudinal axis of the flexible strip. In this embodiment the optical fibre deforms longitudinally in a manner substantially identical to the deformation of the flexible strip. This configuration is preferably chosen for cases where slight deformations are to be measured, for example less than 4%, or even less than 2%. In fact, it is estimated that the deformation before an optical fibre breaks is generally less than or equal to 4% in the case of optical fibres based on silica.

In the example in FIG. 9, the optical fibre is arranged in a sine wave traveling in a direction parallel to the longitudinal axis of the flexible strip, with a wavelength LP. This embodiment can allow obtaining measurements where the deformation of the flexible strip is greater than the breaking point of the optical fiber. When the flexible strip elongates, the optical fibre can initially elongate into a sine wave of increasing wavelength LP, until it approaches a position substantially parallel to the longitudinal axis of the flexible strip. It is thus possible to increase significantly the range of measurement and to measure deformations on the order of 10% to 20% for example.

Figure 10A:
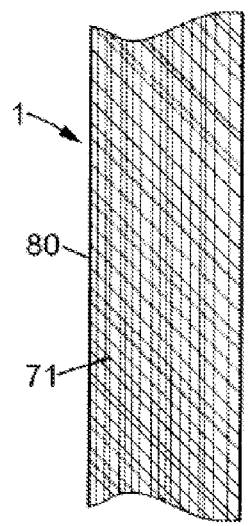
FIGS. 10a, b and c are schematic top views of an embodiment of a flexible strip of the invention.
Figure 10B:
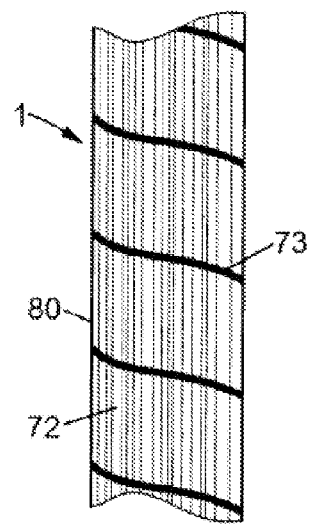
Figure 10C:
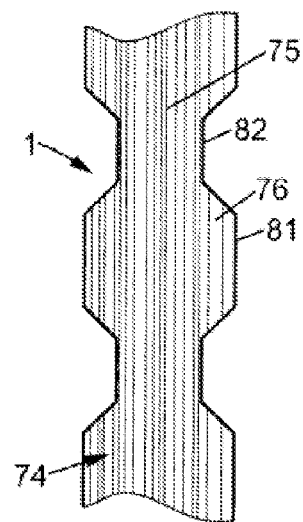

FIGS. 10a to c represent schematic top views of embodiments of flexible strips according to the invention. The different embodiments presented offer possibilities for adjusting the load transfer between the medium and the flexible strip.

FIG. 10a shows an embodiment where the main surface 71 of the flexible strip has a low roughness. An average coefficient of friction results between the medium and said flexible strip.

FIG. 10b shows an embodiment where the main surface 72 of the flexible strip comprises significant roughness, for example obtained using ridges 73 arranged laterally to the surface of said flexible strip. An increased coefficient of friction is obtained between the medium and said flexible strip in comparison to the configuration illustrated in FIG. 10a.

FIG. 10c shows an embodiment where the flexible strip comprises a central portion 75 extending longitudinally and two lateral portions of variable width comprising a plurality of segments 76 arranged continuously with and of the same material as the central portion 75. An edge of such a flexible strip comprises rectilinear segments 82 circumscribing the central portion 75 and rectilinear segments 81 circumscribing the greatest width of the lateral portions. In the example represented, the main surface 74 of the flexible strip is slightly rough. The presence of the segments 76 very substantially increases the adhesion between the medium and the strip, due to the distributed anchors, in comparison to the configuration illustrated in FIG. 10a.

In general, the flexible strips of the invention may be manufactured by extrusion using techniques known to a person skilled in the art.

Figure 11:
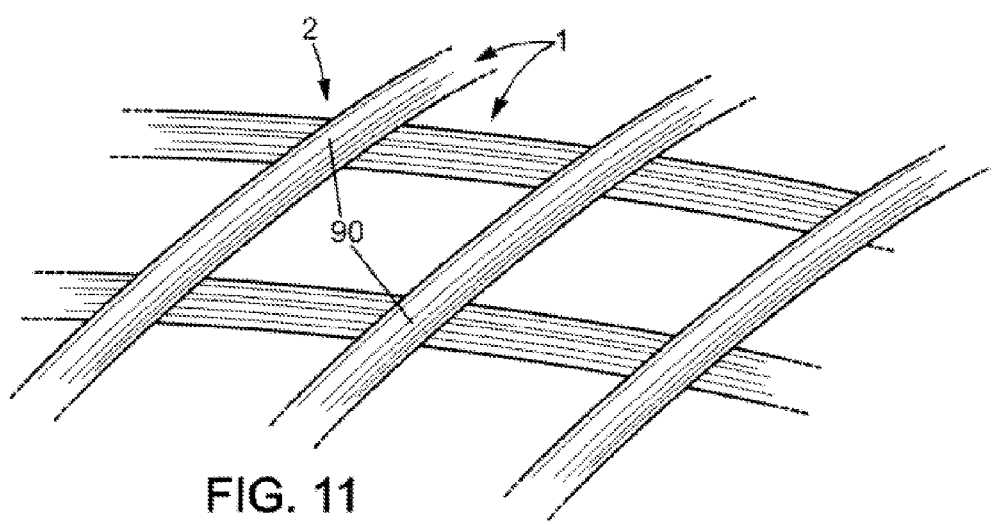
FIG. 11 is a schematic perspective view of an array of flexible strips bonded to each other according to the invention.

FIG. 11 schematically illustrates an embodiment of the invention where a plurality of flexible strips 1 of the invention are arranged in an array 2 and bonded to each other at their points of intersection. As an example, it is possible to attach the flexible strips at the areas of intersection 90 by thermal welding, for example bringing their surface to temperatures of between 100 and 200° C.

It is thus possible to obtain a grid for dimensional measurement for a structure and to obtain planar mapping of deformations and/or temperatures.

The flexible strips described above can be connected to measurement devices able to emit light and measure the characteristics of the light reflected, backscattered, or transmitted in the optical fibre(s) comprised in said flexible strips. These form devices which allow determining locations and measurements of deformations and/or temperatures, which can be installed in or on a structure.

It will be noted that the flexible strips can be arranged horizontally or vertically or at an angle within the structure, depending on requirements.

The invention is not limited to these types of embodiments and is to be interpreted in a non-limiting manner, encompassing any equivalent embodiment.

What is claimed is:

1. A flexible strip having a longitudinal axis and intended for installation in or on a civil engineering structure, the flexible strip comprising at least one optical fibre to allow determining locations and measurements of deformation and/or measurements of temperature for the structure, said optical fibre being arranged substantially along the longitudinal axis and being surrounded by a thermoplastic polymer matrix that is at least partially reinforced, substantially along the longitudinal axis, with continuous reinforcing fibres, the amount by weight of continuous reinforcing fibres extending substantially along the longitudinal axis, WCF, being greater than or equal to ten times the amount by weight of optical fibre(s), WOF, said flexible strip comprising at least one region where the polymer matrix comprises continuous reinforcing fibres, distributed in a substantially uniform manner, surrounded by a region of polymer matrix free of continuous reinforcing fibre, said optical fibre being arranged within said at least one region where the polymer matrix comprises continuous reinforcing fibres.

2. The flexible strip of claim 1, comprising a plurality of regions where the polymer matrix comprises continuous reinforcing fibres and at least one optical fibre, said regions being arranged parallel to each other in the direction of the strip length, side by side in the direction of the strip width, and being separated by regions of polymer matrix free of continuous reinforcing fibre.

3. The flexible strip of claim 1, wherein at least one optical fibre is arranged substantially parallel to the longitudinal axis of the flexible strip.

4. The flexible strip of claim 1, wherein at least one optical fibre is arranged about a direction substantially parallel to the longitudinal axis of the flexible strip.

5. An array of flexible strips intended for installation in or on a civil engineering structure, wherein the flexible strips are bonded together, and wherein each flexible strip of the array comprises at least one optical fibre to allow determining locations and measurements of deformation and/or measurements of temperature for the structure, said optical fibre being arranged substantially along a longitudinal axis of said flexible strip and being surrounded by a thermoplastic polymer matrix that is at least partially reinforced, substantially along the longitudinal axis, with continuous reinforcing fibres, the amount by weight of continuous reinforcing fibres extending substantially along the longitudinal axis, WCF, being greater than or equal to ten times the amount by weight of optical fibre(s), WOF, at least some of the flexible strips comprising at least one region where the polymer matrix comprises continuous reinforcing fibres, distributed in a substantially uniform manner, surrounded by a region of polymer matrix free of continuous reinforcing fibre, said optical fibre being arranged within said at least one region where the polymer matrix comprises continuous reinforcing fibres.

6. The flexible strip of claim 4, wherein said at least one optical fibre is arranged following a path in the form of a sine wave.

7. The array of claim 5, wherein each flexible of said at least some of the flexible strips comprises a plurality of regions where the polymer matrix comprises continuous reinforcing fibres and at least one optical fibre, said regions being arranged parallel to each other in the direction of the strip length, side by side in the direction of the strip width, and being separated by regions of polymer matrix free of continuous reinforcing fibre.

8. The array of claim 5, wherein, in said at least some of the flexible strips, at least one optical fibre is arranged substantially parallel to the longitudinal axis of the flexible strip.

9. The array of claim 5, wherein, in said at least some of the flexible strips, at least one optical fibre is arranged about a direction substantially parallel to the longitudinal axis of the flexible strip.

10. The array of claim 5, wherein the flexible strips are bonded together by thermal welding.

* * * * *